US012592504B2

(12) United States Patent
Wang et al.

(10) Patent No.: US 12,592,504 B2
(45) Date of Patent: Mar. 31, 2026

(54) BUS CONNECTION WIRE FORWARD SOLDERING STRUCTURE

(71) Applicant: JESS-LINK PRODUCTS CO., LTD., New Taipei City (TW)

(72) Inventors: Wen-Yu Wang, New Taipei City (TW); Chieh-Ming Cheng, New Taipei City (TW)

(73) Assignee: JESS-LINK PRODUCTS CO., LTD., New Taipei City (TW)

( * ) Notice: Subject to any disclaimer, the term of this patent is extended or adjusted under 35 U.S.C. 154(b) by 375 days.

(21) Appl. No.: 18/525,292

(22) Filed: Nov. 30, 2023

(65) Prior Publication Data

US 2025/0118913 A1 Apr. 10, 2025

(30) Foreign Application Priority Data

Oct. 4, 2023 (TW) ................................. 112210754

(51) Int. Cl.
*H01R 12/63* (2011.01)
*H01R 4/36* (2006.01)
*H01R 13/639* (2006.01)

(52) U.S. Cl.
CPC ............... *H01R 12/63* (2013.01); *H01R 4/36* (2013.01); *H01R 13/639* (2013.01)

(58) Field of Classification Search
CPC .......... H01R 12/63; H01R 12/62; H01R 4/36; H01R 13/639
USPC .......................................................... 439/493
See application file for complete search history.

(56) References Cited

U.S. PATENT DOCUMENTS 4,691,972 A * 9/1987 Gordon ................ H01R 12/774 439/493
4,913,656 A * 4/1990 Gordon .................. H01R 12/79 439/493
8,221,134 B2 * 7/2012 Dove ..................... H01R 12/59 439/493
8,672,689 B2 * 3/2014 Tseng ....................... H05K 3/34 439/493
8,758,030 B2 * 6/2014 Chen ...................... H01R 12/62 439/493
2010/0226103 A1 * 9/2010 Muro .................. H05K 1/0215 174/254

* cited by examiner

*Primary Examiner* — Gary F Paumen
(74) *Attorney, Agent, or Firm* — HDLS IPR SERVICES; Chun-Ming Shih

(57) ABSTRACT

A bus connection wire forward soldering structure includes a circuit board, a flat cable and a fixing member, and the circuit board has a solder area, a docking area, first and second surfaces and an outgoing line direction. The solder area is disposed on the first surface, the flat cable includes a solder terminal, first and second attaching sections, a folding section and a main body section, the solder terminal faces the docking area and is electrically connected to the solder area, the folding section is connected between the first and second attaching sections, the main body section extends along the outgoing line direction, the fixing member covers the solder terminal, the folding section, the first and second attaching sections, the fixing member has a notch defined corresponding to the second surface and located at junction of the second attaching section and the main body section junction.

10 Claims, 12 Drawing Sheets

BUS CONNECTION WIRE FORWARD SOLDERING STRUCTURE

BACKGROUND OF THE DISCLOSURE

Technical Field

The technical field relates to a bus connection wire, and more particularly relates to a bus connection wire forward soldering structure that adopts forward soldering (or welding) to avoid the issues of signal degradation and impedance mismatch.

Description of Related Art

Peripheral Component Interconnect Express (PCIe) bus connection wire is used extensively in the connector industry, and it mainly includes a flat cable, and a circuit board and a connector which are installed at two ends of the flat cable respectively. Since the flat cable itself with high flexibility is bendable and foldable, the bus connection wire is adaptable to different user's environments and able to be flexibly installed and set in the way of forward insertion or reverse insertion, and thus deriving the demand for the reverse wiring of the flat cable.

Specifically, a normal wiring of the flat cable is to connect a wire with the circuit board (at the installed position of the connector) in an opposite extending direction, such that a solder terminal of the flat cable is engaged with the circuit board, and this is called forward soldering. The reverse wiring of the flat cable is to connect the wire with the circuit board in the same extending direction, and thus most designs adopt reverse soldering, that is, the solder terminal of the flat cable is configured toward the opposite connecting direction of the circuit board and allows the cable to extend in the same connection direction toward the circuit board.

However, the reverse soldering of the flat cable to the circuit board may cause the signals to travel extra paths during transmission and produce a stub effect, leading to the problems of signal attenuation and impedance mismatch. This situation may be even more serious when the current industry changes PCIe 3.0 to the faster PCIe Gen5. Therefore, how to design a bus connection wire capable of realizing the demand for reverse wiring and avoiding the negative effects of the reverse soldering demands immediate attentions and feasible solutions.

In view of the aforementioned drawbacks, the present discloser conducted extensive research, applied related principles and theories, and provided a solution to overcome the drawbacks of the related art.

SUMMARY OF THE DISCLOSURE

It is a primary objective of this disclosure to overcome the problems of signal attenuation and impedance mismatch caused by a stub effect produced when the bus connection wire requires a reverse wiring of the flat cable and the need for the signals to travel extra paths during transmission.

To achieve the aforementioned objective, the present disclosure provides a bus connection wire forward soldering structure including a circuit board, a flat cable, and a fixing member. The circuit board has a first surface and a second surface opposite to each other, and the circuit board has a solder area, a docking area and an outgoing line direction defined thereon. The solder area is disposed on the first surface, and the docking area is disposed on one of the first surface and the second surface. The outgoing line direction runs from the solder area toward the docking area. The flat cable includes a solder terminal, a first attaching section, a folding section, a second attaching section and a main body section which are sequentially connected to one another. The solder terminal faces the docking area along the outgoing line direction and is electrically connected to the solder area. The first attaching section is substantially attached to the first surface, and the second attaching section is substantially attached to the second surface. The folding section is bent and connected between the first attaching section and the second attaching section. The main body section extends along the outgoing line direction, and the fixing member covers the solder terminal, the first attaching section, the folding section and the second attaching section. The fixing member has a notch defined corresponding to the second surface and disposed at the junction of the second attaching section and the main body section.

In an embodiment of the present disclosure, the fixing member is integrally formed (or formed in one piece) on a side of circuit board away from the docking area, the fixing member has a first fixing portion and a second fixing portion, the first fixing portion is attached to the first surface and covers the solder terminal, the first attaching section and a part of the folding section, the second fixing portion is attached to the second surface and covers the second attaching section and another part of the folding section.

In an embodiment of the present disclosure, the circuit board has a plurality of through holes, each through hole penetrates the circuit board from the first surface to the second surface, the fixing member has a plurality of positioning pillars, and each positioning pillar is accommodated in each through hole and connected between the first fixing portion and the second fixing portion.

In an embodiment of the present disclosure, the notch is disposed on a side of the second fixing portion facing the docking area, and the cross-sectional length of the first fixing portion along the outgoing line direction is greater than the cross-sectional length of the second fixing portion along the outgoing line direction.

In an embodiment of the present disclosure, the fixing member includes a first casing and a second casing, a side of the first casing facing the circuit board has a first slot, a side of the second casing facing the circuit board has a second slot, the first casing and the second casing jointly clamp the circuit board, and the solder terminal, the first attaching section, the folding section and the second attaching section are accommodated in the first slot and the second slot.

In an embodiment of the present disclosure further includes a bolt and a nut, the bolt sequentially passes through the first casing, the circuit board and at least one part of the second casing and is locked to the nut.

In an embodiment of the present disclosure, the first casing has a column, the second casing has a groove, and the column is inserted into the groove.

In an embodiment of the present disclosure, the notch is disposed on a side of the second casing facing the circuit board, the notch is disposed on a side of the second casing facing the docking area, and the notch communicates with the second slot.

In an embodiment of the present disclosure, the bus connection wire forward soldering structure further includes a connector installed on a side of the circuit board corresponding to the outgoing line direction and electrically connected to the docking area.

In an embodiment of the present disclosure, the main body section includes a slope section and a level section, the slope section is slantingly connected between the second attaching section and the level section to make the level section bypass the outer periphery of the connector.

The bus connection wire forward soldering structure of the present disclosure adopts the forward soldering method to electrically connect the solder terminal of flat cable to the solder area of the first surface, so that the first attaching section of the flat cable is flatly attached to the first surface, and the flat cable is reversely folded and bent from the first surface of the circuit board to let the second attaching section be attached to the second surface. In this way, the main body section may extend along the outgoing line direction and face toward the same direction as the solder terminal, so as to achieve the reverse wiring effect, while avoiding the direct reverse soldering of the flat cable, which may cause extra paths for signals to travel during transmission and produce a stub effect leading to the problems of signal attenuation and impedance mismatch.

DETAILED DESCRIPTION

Figure 1:
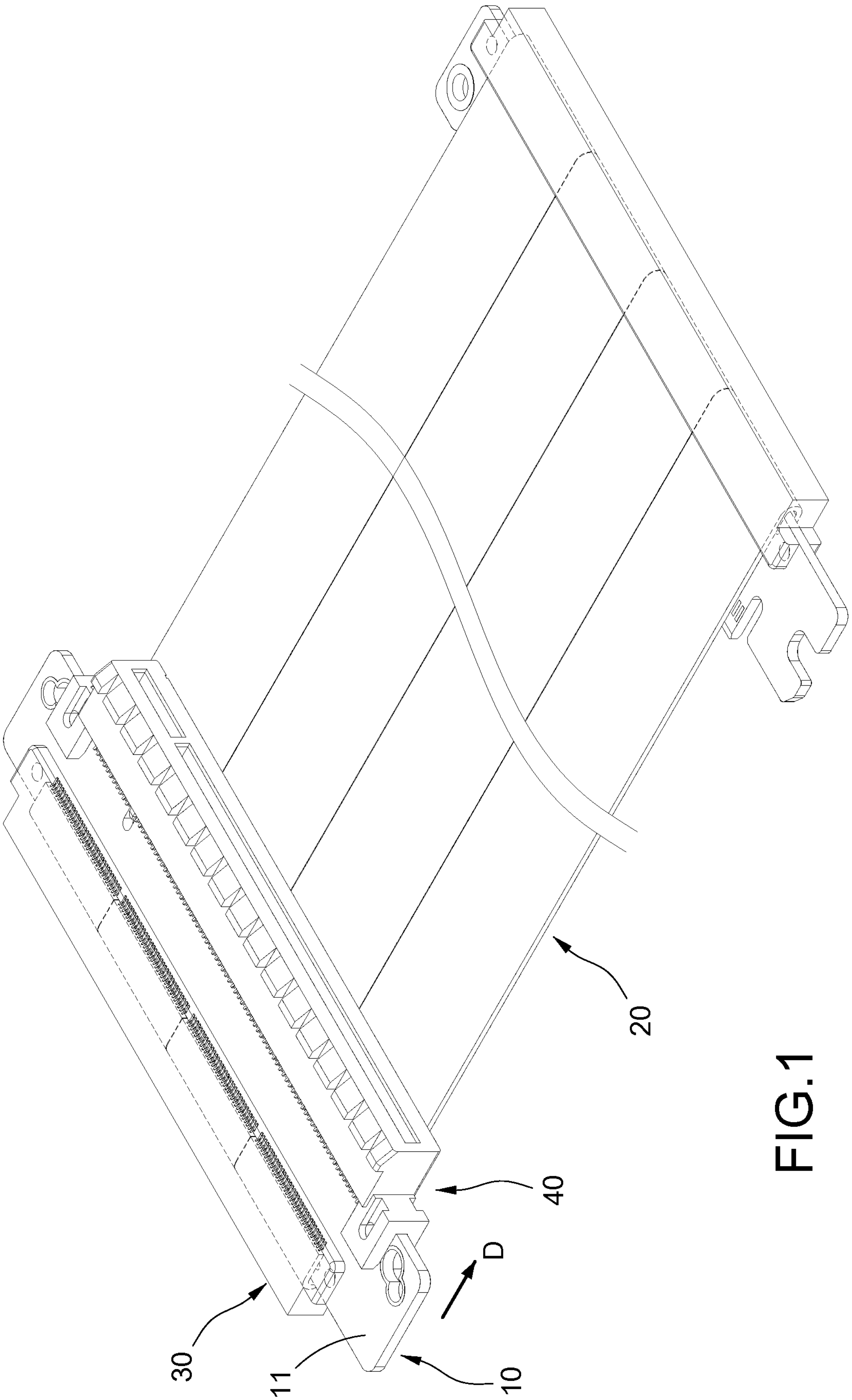
FIG. 1 is a perspective view of a first embodiment of the present disclosure.
Figure 2:
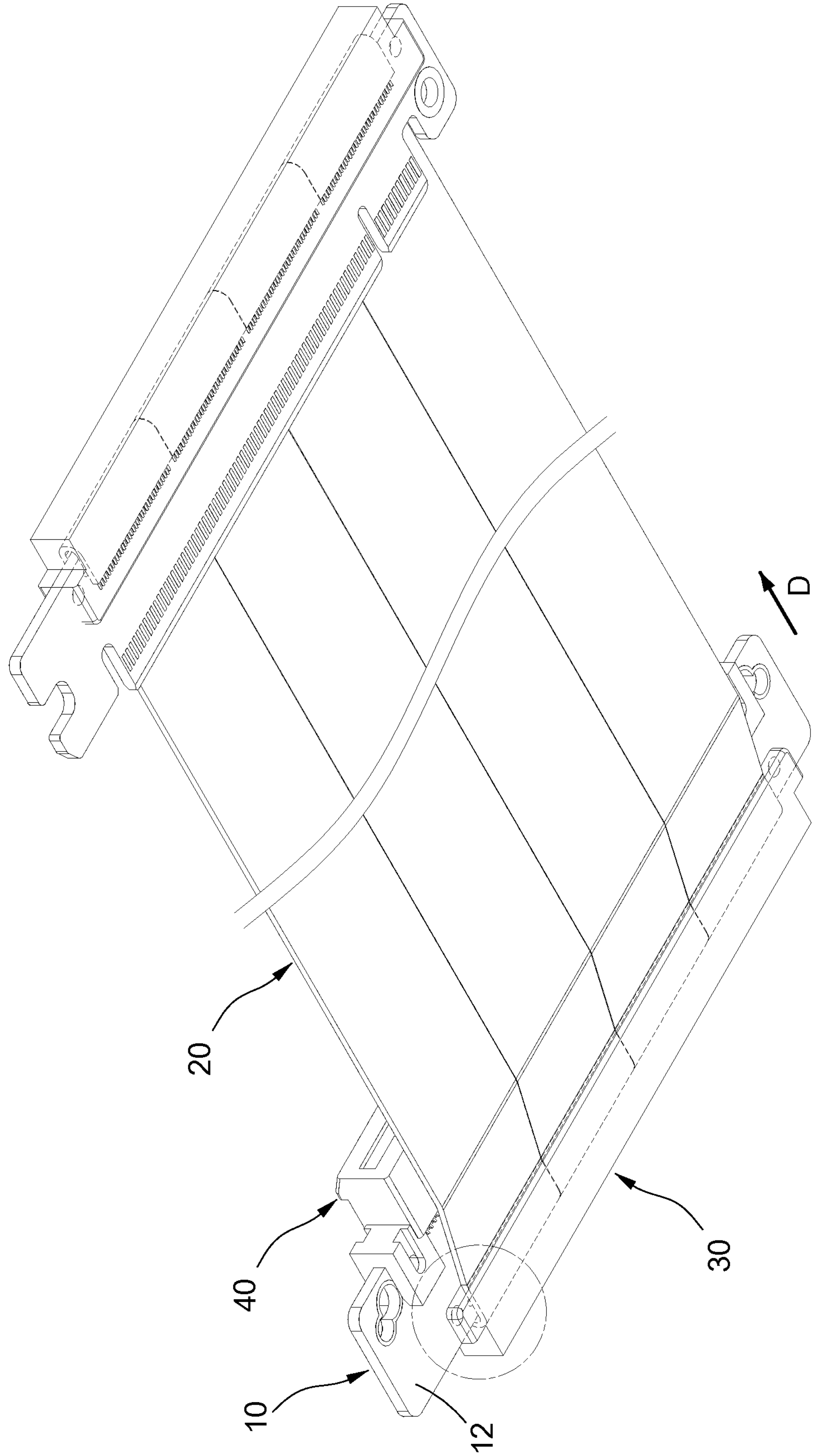
FIG. 2 is another perspective view of the first embodiment of the present disclosure.
Figure 3:
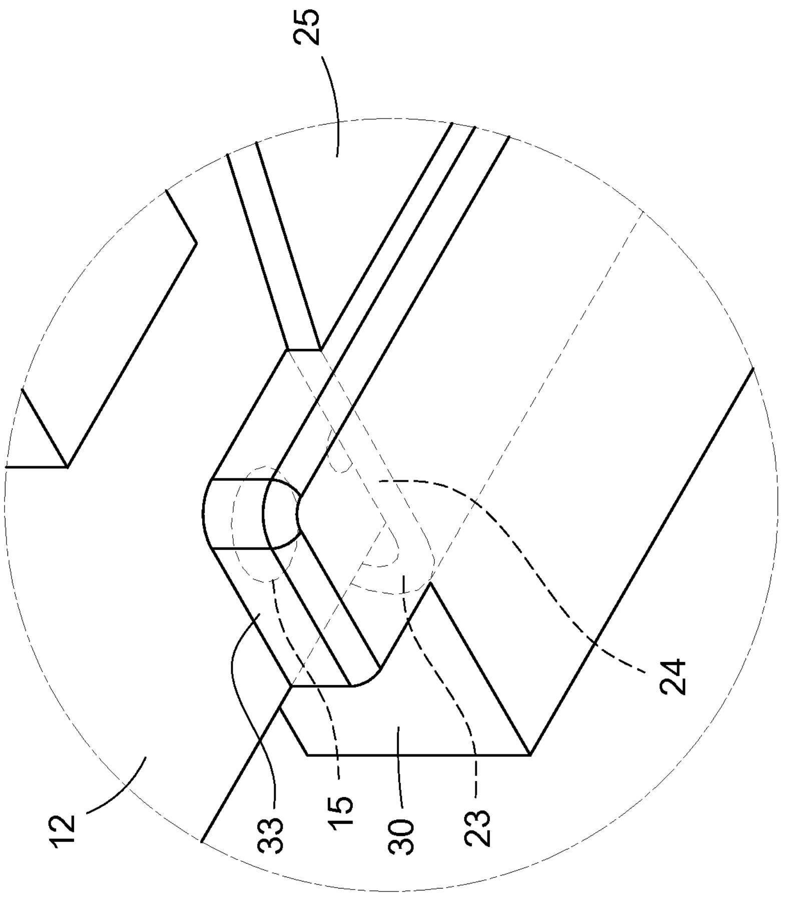
FIG. 3 is a partial blowup view of FIG. 2.

In the description of the present disclosure, it is to be understood that the terms “front side”, “rear side”, “left side”, “right side”, “front end”, “rear end”, “end”, “vertical”, “horizontal”, “top”, “bottom”, etc. indicate an orientation or positional relationship based on the orientation or positional relationship shown in the accompanying drawings, and are provided for the purposes of describing the present disclosure and simplifying the description only, but not intended for indicating or implying that the device or component referred to must have a specific orientation, be constructed and operated in a specific orientation, and therefore should not be construed as a limitation on the present disclosure.

As used herein, terms such as “first”, “second”, “third”, “fourth” and “fifth” are used to describe elements, components, regions, layers and/or parts, but the elements, components, regions, layers and/or parts should not be restricted by these terms. These terms are only used to distinguish an element, component, region, layer or part from another, and the use of these terms including “first”, “second”, “third”, “fourth” and “fifth” in this specification does not imply their order or sequence unless the context clearly indicates otherwise.

The features and technical contents of the present disclosure will become apparent from the following detailed description taken with the accompanying drawing. It is intended that the embodiments and drawing disclosed herein are to be considered illustrative rather than restrictive.

The present disclosure provides a bus connection wire forward soldering structure. With reference to FIGS. 1 to 7 for the first embodiment of the present disclosure, the bus connection wire forward soldering structure of this embodiment includes at least one circuit board 10, a flat cable 20, at least one fixing member 30 and at least one connector 40. In this embodiment, there are two circuit boards 10 and two fixing members 30, the circuit boards 10 and the fixing members 30 are disposed at two ends of the flat cable 20 in a manner of equal quantities, and the structures and shapes are substantially the same, but the present disclosure is not limited to such arrangement. It is noteworthy that a single circuit board 10 and a single fixing member 30 are used in the embodiment for the purpose of illustrating the present disclosure, but the present disclosure does not limit the quantity of circuit board 10, fixing member 30 and connector 40 to one only.

In FIGS. 1 to 5, the circuit board 10 has a first surface 11 and a second surface 12, which are opposite to each other. The circuit board 10 has a solder area 13, at least one docking area 14 and an outgoing line direction D defined thereon. In this embodiment, the first surface 11 is the upper surface of the circuit board 10, the second surface 12 is the lower surface of the circuit board 10. The solder area 13 is located on the rear side of the first surface 11, the docking area 14 is located on the front side of one of the first surface 11 and the second surface 12. In this embodiment, there are two docking areas 14 disposed on the first surface 11 and the second surface 12 and located relative to each other, but the present disclosure is not limited to such arrangement. The outgoing line direction D runs from the solder area 13 toward the docking area 14, that is, from the rear side of the circuit board 10 toward the front side of the circuit board 10. The docking area 14 includes a goldfinger extending along the outgoing line direction D.

Figure 4:
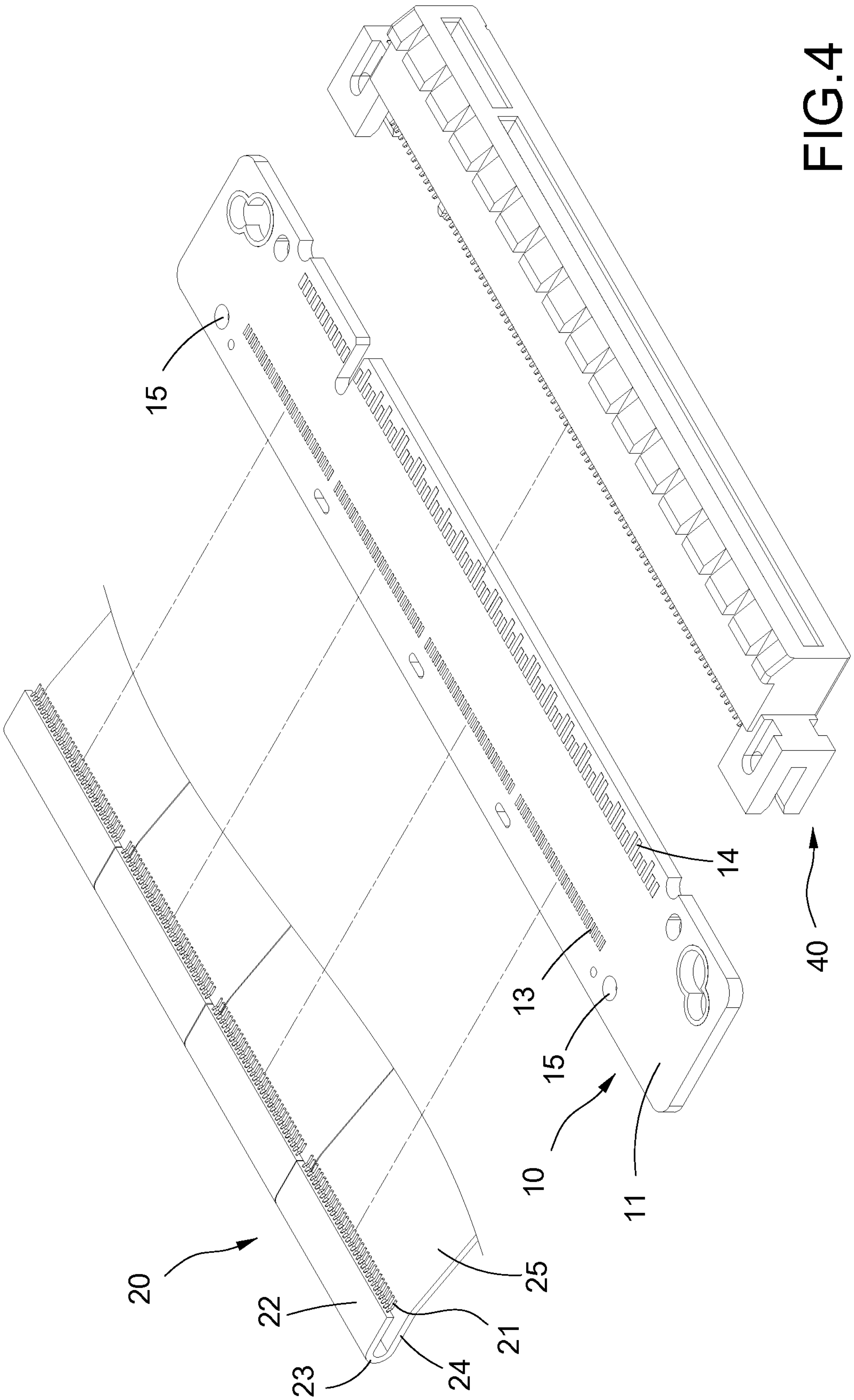
FIG. 4 is a partially exploded view of the first embodiment of the present disclosure.
Figure 5:
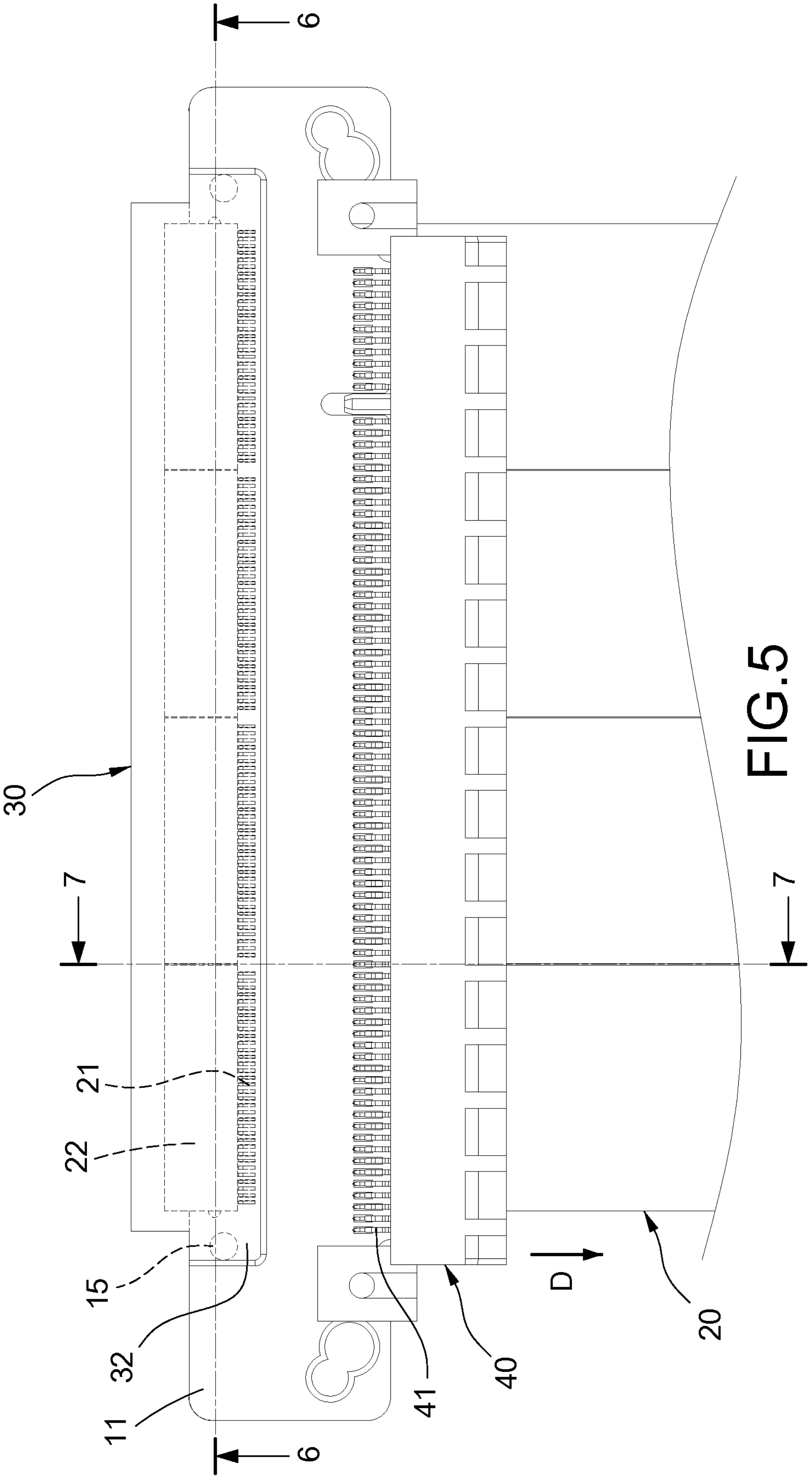
FIG. 5 is a partial top view of the first embodiment of the present disclosure.
Figure 6:
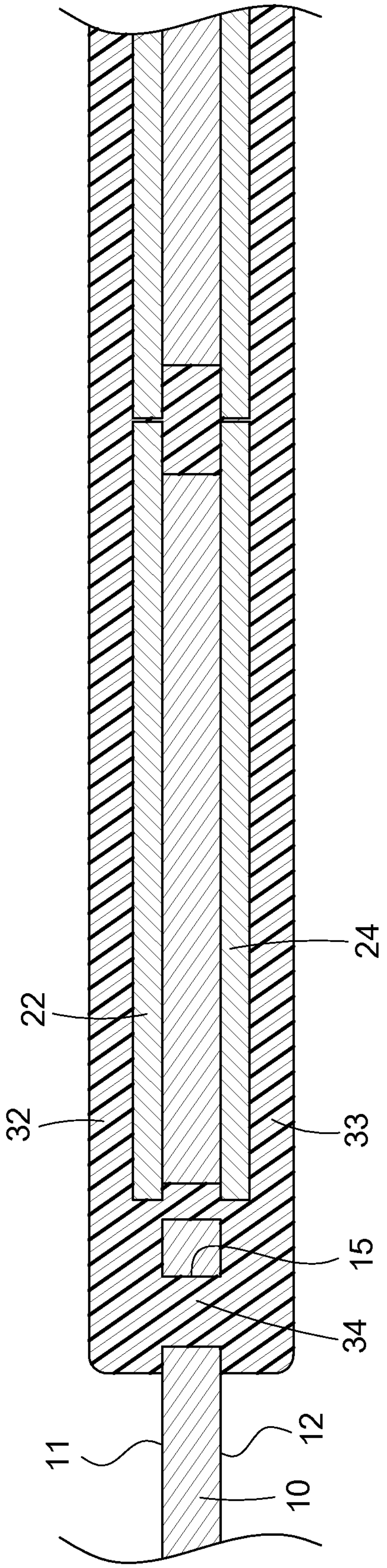
FIG. 6 is a cross-sectional side view of Section 6-6 of FIG. 5.
Figure 7:
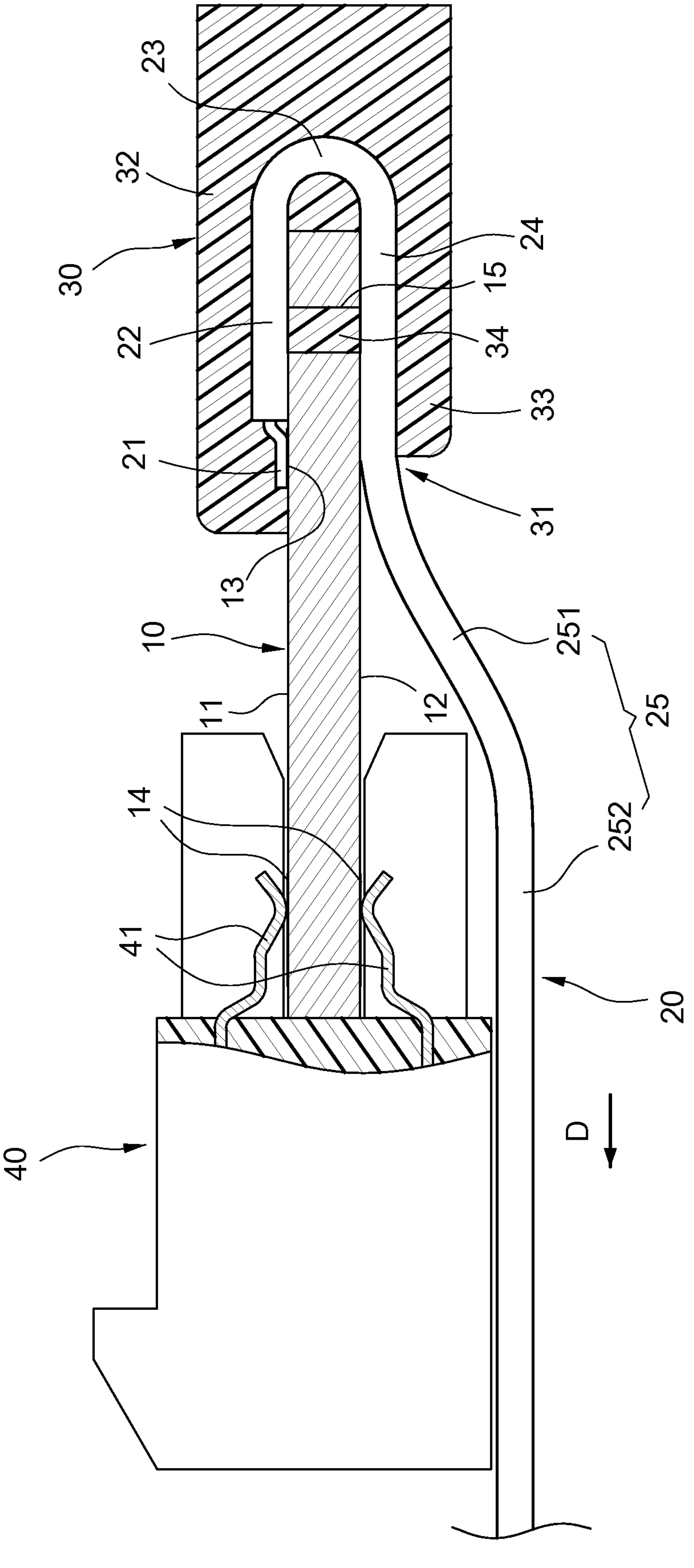
FIG. 7 is a cross-sectional side view of Section 7-7 of FIG. 5.
Figure 8:
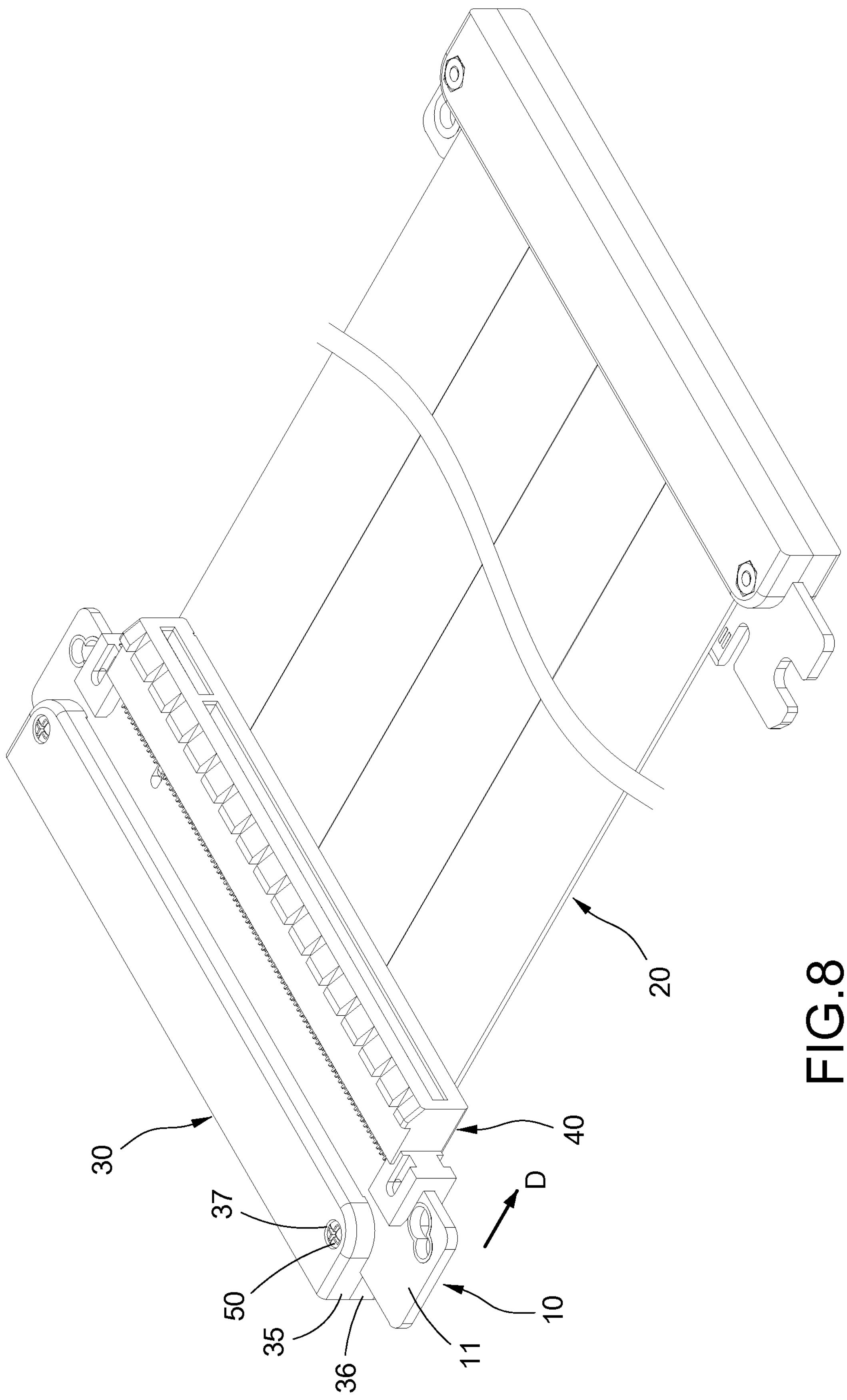
FIG. 8 is a perspective view of a second embodiment of the present disclosure.

In FIGS. 4, 5 and 7, an end of the flat cable 20 includes at least one solder terminal 21, a first attaching section 22, a folding section 23, a second attaching section 24 and a main body section 25, which are sequentially connected to one another. The solder terminal 21 faces the docking area 14 along the outgoing line direction D and is electrically connected to the solder area 13 of the first surface 11. The first attaching section 22 is flatly attached to the first surface 11. The second attaching section 24 is flatly attached to the second surface 12. The folding section 23 is bent into an inverted U-shape and connected between the first attaching section 22 and the second attaching section 24. The main body section 25 is extended outward along the outgoing line direction D and away from the circuit board 10 to be connected with another end of the flat cable 20. In this embodiment, there is a plurality of solder terminals 21, and the solder terminals 21 are arranged in a row and electrically connected to the solder area 13.

It is noteworthy that “the first attaching section 22 is substantially attached to the first surface 11” refers to the arranging manner of the first attaching section 22, that is, there is still a possibility of having a very small gap between the first attaching section 22 and the first surface 11, instead of the configuration of first attaching section 22 being completely attached and fixed to the first surface 11. The same applies to the second attaching section 24 that is substantially attached to the second surface 12, and here is omitted for brevity. In FIGS. 1, 2, 5 and 7, the fixing member 30 covers and is fixed to the solder terminal 21, the first attaching section 22, the folding section 23 and the second attaching section 24. In this embodiment, the fixing member 30 is integrally formed (formed in one piece) on a side of the circuit board 10 away from the docking area 14 by plastic injection molding, but the present disclosure is limited to such arrangement. The fixing member 30 has a notch 31 defined corresponding to the second surface 12 and located at the junction of the second attaching section 24 and the main body section 25.

In FIGS. 1, 2, 4, 5 and 7, the connector 40 is installed on a side of circuit board 10 corresponding to the outgoing line direction D and electrically connected to the docking area 14. Specifically, the connector 40 has at least a plurality of elastic docking plates 41 arranged in a row, and each elastic docking plate 41 is elastically engaged with the goldfinger of the docking area 14 to form an electrical connection. In this embodiment, the first surface 11 and the second surface 12 have the docking areas 14 at the corresponding positions respectively, and the connector 40 includes upper and lower rows of elastic docking plates 41 which are engaged with the docking areas 14 on the first surface 11 and the second surface 12 respectively. However, the present disclosure is not limited to such arrangement only, and the connector 40 may also have one row of elastic docking plates 41 which are engaged with the docking area 14 on one of the sides of the circuit board 10.

In this embodiment, the main body section 25 includes a slope section 251 and a level section 252, but the present disclosure is not limited to such arrangement only. The slope section 251 is slantingly connected between the second attaching section 24 and the level section 252, so that the level section 252 bypasses the outer edge of the connector 40 without producing interference. The notch 31 allows the fixing member 30 to have a clearance space, so that the second attaching section 24 and the slope section 251 of the flat cable 20 have enough space to bend and tilt, thus avoiding the flat cable 20 from being damaged, excessively deformed, or failed due to signal obstruction at the bending position between the second attaching section 24 and the slope section 251. It is noteworthy that in other embodiments not shown in the figures, if the connector 40 is directly installed on the first surface 11, the main body section 25 may no longer need the slope section 251, and the level section 252 may be straightly attached to the second surface 12 and extended outward along the outgoing line direction D.

In the bus connection wire forward soldering structure of the present disclosure, the forward soldering method is adopted to electrically connect the plurality of solder terminals 21 of the flat cable 20 to the solder area 13 on the first surface 11 of the circuit board 10, so that the first attaching section 22 of the flat cable 20 is flatly attached to the first surface 11, and the flat cable 20 is reversely folded and bent from the first surface 11 of the circuit board 10 to allow the second attaching section 24 to be flatly attached to the second surface 12, and let the main body section 25 extend along the outgoing line direction D and in the same facing direction of each solder terminal 21, so as to achieve the reverse wiring effect, and avoid the problems of signal attenuation and impedance mismatch caused by a stub effect produced when the bus connection wire requires a reverse wiring of the flat cable 20 and the need for the signals to travel extra paths during transmission.

With reference to FIGS. 1 to 3, 6 and 7 for a more detailed description, the fixing member 30 has a first fixing portion 32 and a second fixing portion 33. The first fixing portion 32 is flatly attached on first surface 11, and fixedly covers each solder terminal 21, the first attaching section 22 and a part of the folding section 23 to fix each solder terminal 21, the first attaching section 22 and folding section 23 and prevent them from shaking. The second fixing portion 33 is flatly attached to the second surface 12, and fixedly covers the second attaching section 24 and another part of the folding section 23, so as to fix the second attaching section 24 and folding section 23 and prevent them from shaking. In addition, the circuit board 10 has a plurality of through holes 15, the fixing member 30 has a plurality of positioning pillars 34. Each through hole 15 penetrates the circuit board 10 from the first surface 11 to the second surface 12. Each positioning pillar 34 is accommodated in each through hole 15 respectively and connected between the first fixing portion 32 and the second fixing portion 33, so that the fixing member 30 is fixed in position and may not rotate or move vertically or horizontally relative to the circuit board 10. It is noteworthy that each positioning pillar 34 and the fixing member 30 of this embodiment are integrally formed (or formed in one piece) by plastic injection molding.

In this embodiment, the notch 31 is disposed on a side of the second fixing portion 33 facing the docking area 14. In some embodiments, the notch 31 completely penetrates a side of the second fixing portion 33 facing the docking area 14 in a horizontal direction. In the cross-sectional view of FIG. 7, the cross-sectional length of the first fixing portion 32 along the outgoing line direction D is greater than the cross-sectional length of the second fixing portion 33 along the outgoing line direction D, so that the cross-sectional shape of the fixing member 30 along the outgoing line direction D is substantially "¬" shape. This enables the second attaching section 24 and the slope section 251 of the flat cable 20 at the notch 31 has enough space for bending and tilting to prevent damage, excessive deformation and signal obstruction of the flat cable 20 at the bend between the second attaching section 24 and the slope section 251. In addition, the notch 31 has the effects of dodging the via of the circuit board 10 in the solder area 13 and preventing the via from being covered completely and the quality of signal transmission from being affected adversely.

With reference to FIGS. 8 to 11, the major difference of the second embodiment from the first embodiment of the present disclosure is the structure of the fixing member 30, which is elaborated below.

In this embodiment, the fixing member 30 includes a first casing 35 and a second casing 36. The first casing 35 has a first slot 351 formed on a side facing the circuit board 10. The second casing 36 has a second slot 361 formed on a side facing the circuit board 10. The first casing 35 and the second casing 36 jointly clamp the upper and lower sides of the circuit board 10. In this embodiment, the first casing 35 is disposed corresponding to the first surface 11, the second casing 36 is disposed corresponding to the second surface 12, but the present disclosure is not limited to such arrangement. For example, the first casing 35 is disposed corresponding to the second surface 12, and the second casing 36 is disposed corresponding to the first surface 11. The solder terminal 21, first attaching section 22, folding section 23 and second attaching section 24 are contained in the first slot 351 and the second slot 361 and thus protected by the first casing 35 and the second casing 36, and may not be interfered with the first casing 35 and the second casing 36.

Figure 10:
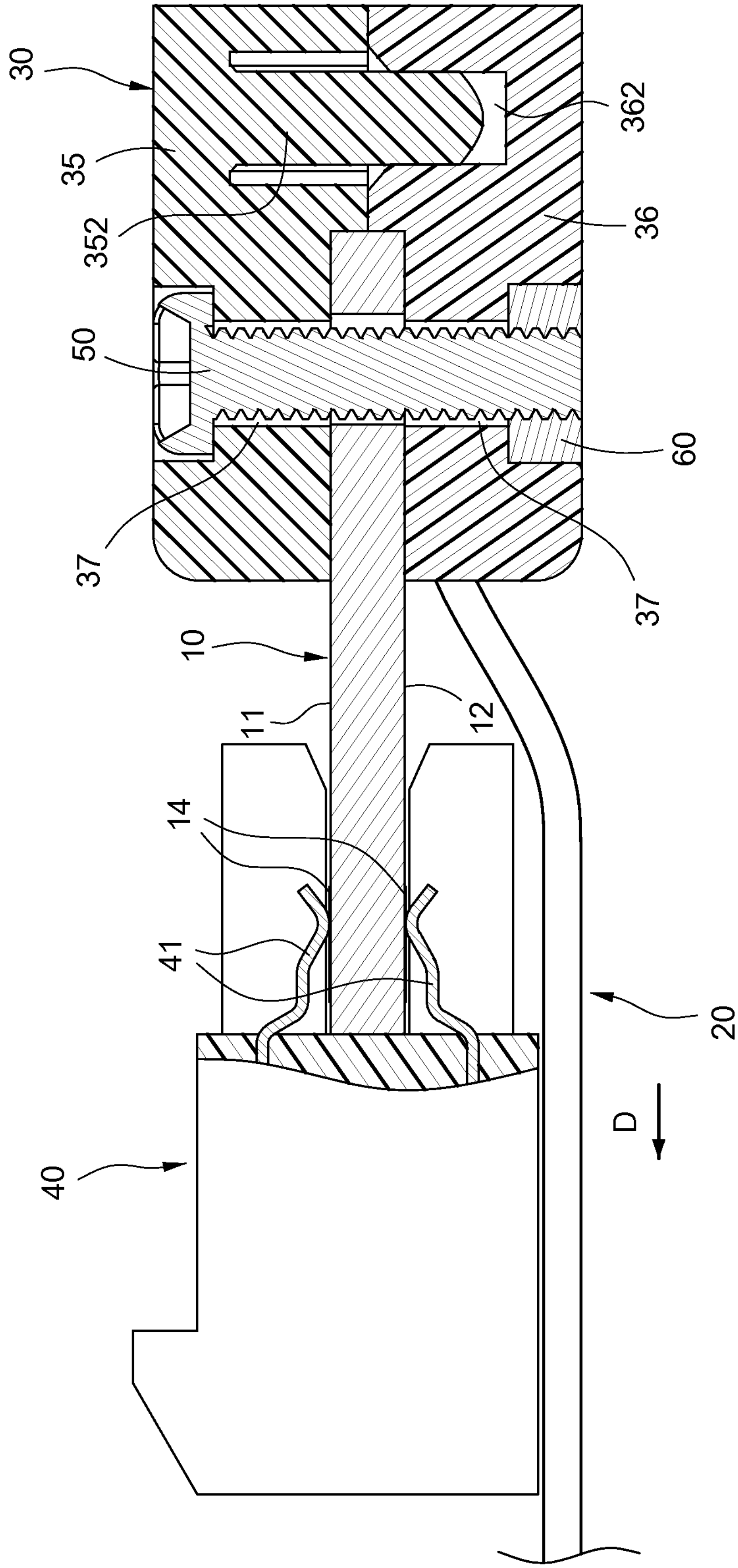
FIG. 10 is a partially cross-sectional side view of the second embodiment of the present disclosure.

This embodiment further includes at least one bolt 50 and at least one nut 60 with the quantity corresponding to that of the bolt 50. The bolt 50 sequentially passes through the first casing 35, the circuit board 10 and at least one part of the second casing 36 and is locked to the nut 60, so as to forcibly press the first casing 35 and second casing 36 to securely clamp the circuit board 10. Specifically, the circuit board 10 has at least one via 16, the first casing 35 and the second casing 36 have at least one counterbore 37 respectively, and the counterbore 37 of the first casing 35 and the counterbore 37 of the second casing 36 are configured to be opposite to each other as shown in FIG. 10. Therefore, after the bolt 50 passes through one of the counterbores 37, the bolt 50 passes through the via 16 of the circuit board 10 and passes another counterbore 37 in the opposite direction, and is screwed and secured to the nut 60. The head of the bolt 50 and the nut 60 are accommodated in each counterbore 37 without protruding from the first casing 35 and the second casing 36. Of course, the present disclosure is not limited to the above arrangement. For example, the circuit board 10, the first casing 35 and the second casing 36 have the via 16 provided for passing the bolt 50 only, and the head of the bolt 50 and the nut 60 are exposed from first casing 35 and second casing 36.

In addition, the first casing 35 has at least one column 352, the second casing 36 has at least one groove 362 with a quantity corresponding to that of the columns 352. The column 352 is inserted into the groove 362 to fix the first casing 35 and the second casing 36 without vertical and horizontal movements. In this embodiment, the quantity of bolts 50, nuts 60, columns 352 and grooves 362 at one of the ends of the flat cable 20 is two, and each bolt 50, each nut 60, each column 352 and each groove 362 are evenly disposed on two sides of the solder area 13, so that each bolt 50 and each nut 60 evenly exert a force onto the first casing 35 and the second casing 36, and each bolt 50, each nut 60, each column 352 and each groove 362 are jointly provided for preventing the first casing 35 and the second casing 36 from rotating moving vertically, or moving horizontally relative to each other. This embodiment of the present disclosure adopts a plurality of bolts 50, nuts 60, columns 352 and grooves 362, but other embodiments having is only one bolt 50, one nut 60, one column 352 and one groove 362 still has the effect of preventing the first casing 35 and the second casing 36 from rotating, moving vertically, and moving horizontally relative to each other.

Figure 9:
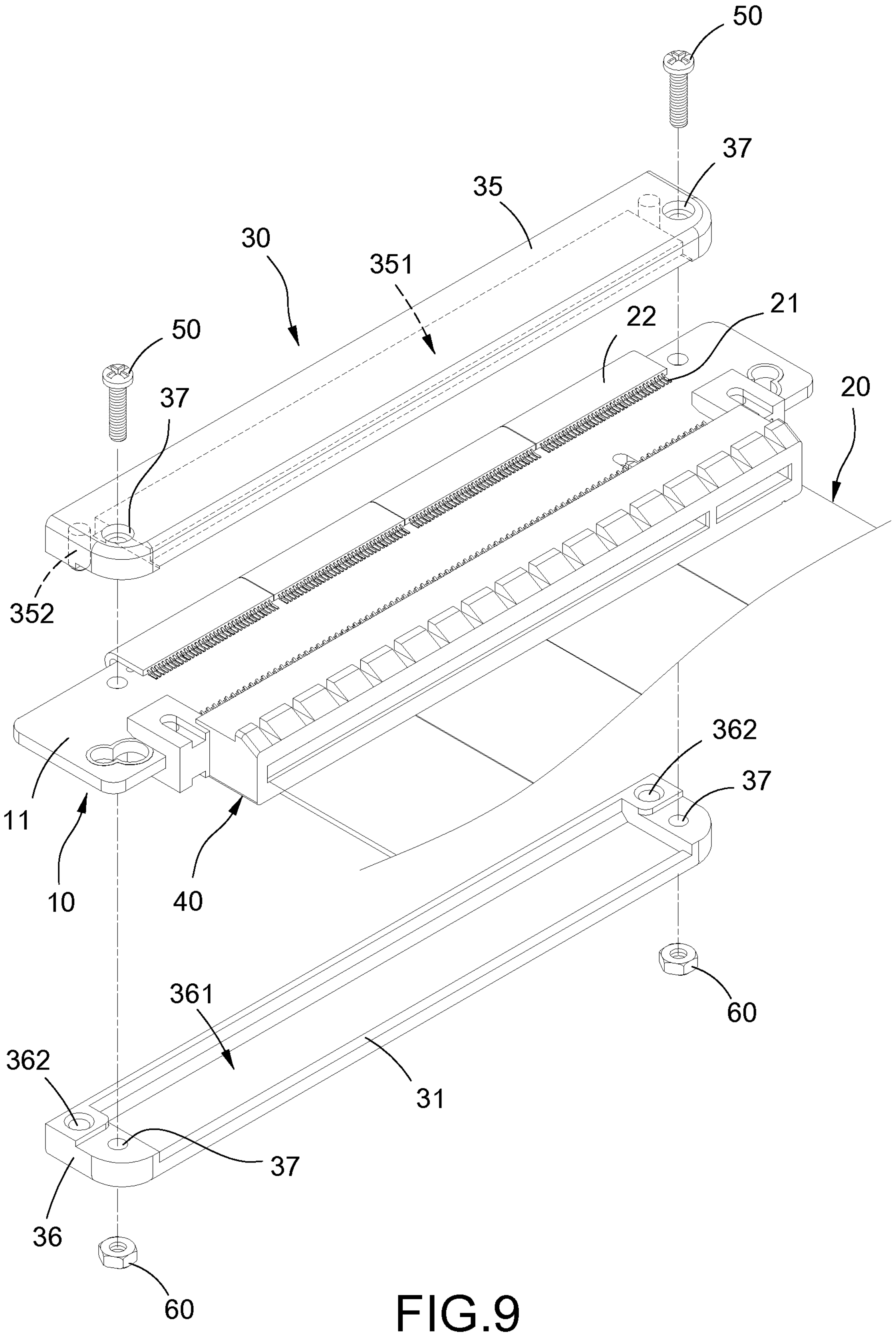
FIG. 9 is a partially exploded view of a second embodiment of the present disclosure.
Figure 11:
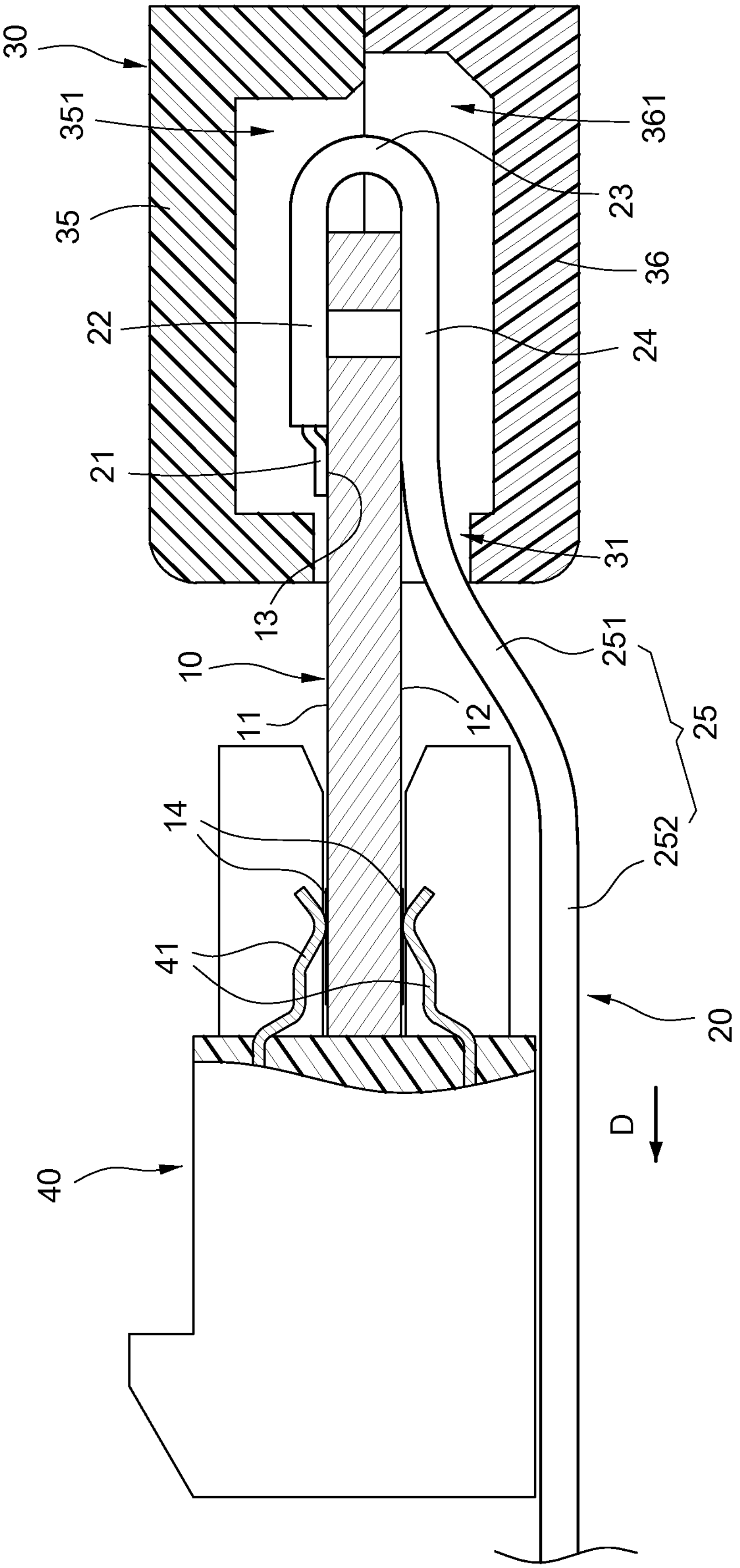
FIG. 11 is another partially cross-sectional side view of the second embodiment of the present disclosure.

In FIGS. 9 and 11, the notch 31 of this embodiment is formed on a side of the second casing 36 facing the circuit board 10, and the notch 31 is disposed on a side of the second casing 36 facing the docking area 14. The notch 31 communicates with the second slot 361. It can be seen from the cross-sectional side view of FIG. 11 that the cross-sectional shape of the first casing 35 along the outgoing line direction D is substantially in an inverted U-shape, and the cross-sectional shape of the second casing 36 along the outgoing line direction D is an inverted L-shape. In this way, there is enough space at the position of the notch 31 provided for the second attaching section 24 and the slope section 251 of the flat cable 20 to bend and tilt, so as to avoid the flat cable 20 at the bending position and between the second attaching section 24 and the slope section 251 from being damaged, excessively deformed, or failed due to the signal obstruction.

Figure 12:
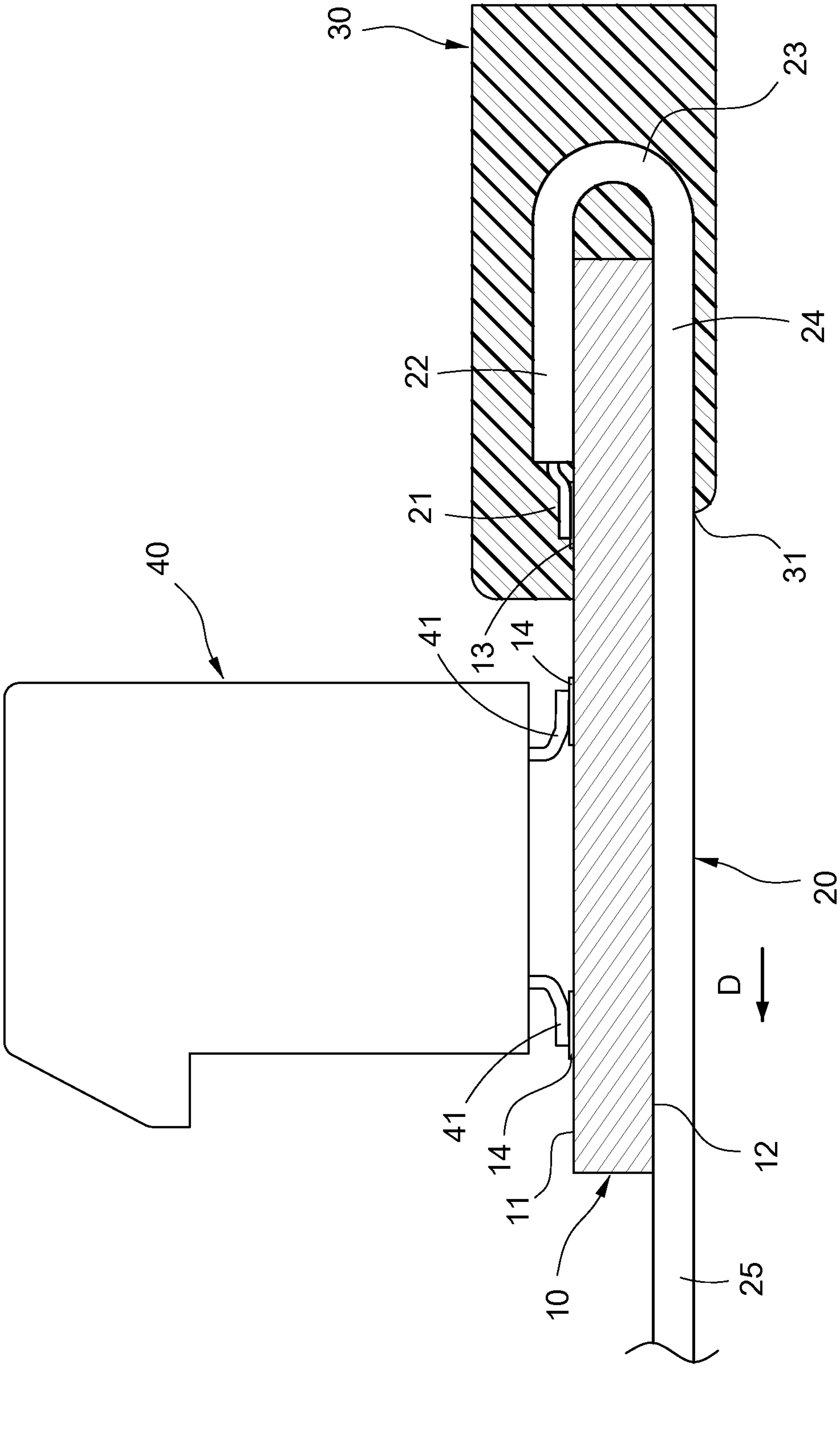
FIG. 12 is a partially cross-sectional view of a third embodiment of the present disclosure.

With reference to FIG. 12, the major difference between the third embodiment and the first embodiment of the present disclosure is the installation positions of the connector 40 and the docking area 14, which is elaborated below.

In this embodiment, the connector 40 is installed on the first surface 11 of the circuit board 10, and there are two docking areas 14 disposed on the first surface 11. Specifically, the connector 40 has a plurality of connecting terminals 41 extended from two sides of the bottom of the connector 40, such that each connecting terminal 41 is connected to two docking areas 14 to form an electrical connection. In this way, the connector 40 of this embodiment is located on the first surface 11, so that after the flat cable 20 is bent from the first surface 11 to the second surface 12, the main body section 25 of the flat cable 20 does not need to be tilt to bypass the connector 40 as the first embodiment does, but the main body section 25 is directly attached to the second surface 12 of the circuit board 10 and the cable can be pulled out along the outgoing line direction D.

In the bus connection wire forward soldering structure of the present disclosure, the plurality of solder terminals 21 of the flat cable 20 is electrically connected to the solder area 13 on the first surface 11 of the circuit board 10, and the flat cable 20 is folded and bent from the first surface 11 of the circuit board 10, so that the main body section 25 is extended along the outgoing line direction D and in the same direction of each solder terminal 21 faces, so as to achieve the reverse wiring effect and avoid the problems of signal attenuation and impedance mismatch caused by a stub effect produced when the bus connection wire requires a reverse wiring of the flat cable 20 and the need for the signals to travel extra paths during transmission. In addition, the fixing member 30 is provided for covering and fixing the solder terminal 21, the first attaching section 22, the folding section 23 and the second attaching section 24 of the flat cable 20 and preventing them from shaking, and the notch 31 formed on the fixing member 30 of the second surface 12 and disposed at the junction of the second attaching section 24 and the main body section 25 provides a clearance space for the flat cable 20 to bend and tilt.

While this disclosure has been described by means of specific embodiments, numerous modifications and variations could be made thereto by those skilled in the art without departing from the scope and spirit of this disclosure set forth in the claims.

What is claimed is:

1. A bus connection wire forward soldering structure, comprising:

a circuit board, comprising a first surface and a second surface opposite to each other, the circuit board comprising a solder area, a docking area, and an outgoing line direction defined thereon, the solder area located on the first surface, the docking area located on one of the first surface and the second surface, and the outgoing line direction defined from the solder area toward the docking area;

a flat cable, comprising a solder terminal, a first attaching section, a folding section, a second attaching section and a main body section sequentially coupled to one another, the solder terminal facing the docking area along the outgoing line direction and electrically coupled to the solder area, the first attaching section substantially attached to the first surface, the second attaching section substantially attached to the second surface, the folding section bent and coupled between the first attaching section and the second attaching section, and the main body section extending along the outgoing line direction; and a fixing member, covering the solder terminal, the first attaching section, the folding section and the second attaching section, comprising a notch defined corresponding to the second surface and located at a conjunction of the second attaching section and the main body section.

2. The bus connection wire forward soldering structure according to claim 1, wherein the fixing member is disposed on a side of the circuit board away from the docking area in a one piece form; the fixing member comprises a first fixing portion and a second fixing portion; the first fixing portion is attached to the first surface and covering the solder terminal, the first attaching section and one part of the folding section; and the second fixing portion is attached to the second surface and covering the second attaching section and another part of the folding section.

3. The bus connection wire forward soldering structure according to claim 2, wherein the circuit board comprises a plurality of through holes, each through hole penetrate the circuit board from the first surface to the second surface; and the fixing member comprises a plurality of positioning pillars, each positioning pillar is accommodated in each through hole and coupled between the first fixing portion and the second fixing portion.

4. The bus connection wire forward soldering structure according to claim 2, wherein the notch is located on a side of the second fixing portion facing the docking area, and the cross-sectional length of the first fixing portion along the outgoing line direction is greater than the cross-sectional length of the second fixing portion along the outgoing line direction.

5. The bus connection wire forward soldering structure according to claim 1, wherein the fixing member comprises a first casing and a second casing; the first casing comprises a first slot defined on a side thereof facing the circuit board; the second casing comprises a second slot defined on a side thereof facing the circuit board; the circuit board is jointly clamped by the first casing and the second casing, and the solder terminal, the first attaching section, the folding section and the second attaching section are accommodated in the first slot and the second slot.

6. The bus connection wire forward soldering structure according to claim 5, further comprising a bolt and a nut, and the bolt sequentially passing through the first casing, the circuit board and at least one part of the second casing, and locked to the nut.

7. The bus connection wire forward soldering structure according to claim 5, wherein the first casing comprises a column, the second casing comprises a groove, and the column is inserted in the groove.

8. The bus connection wire forward soldering structure according to claim 5, wherein the notch is defined on a side surface of the second casing facing the circuit board and located on a side of the second casing facing the docking area, and the notch communicates with the second slot.

9. The bus connection wire forward soldering structure according to claim 1, further comprising a connector installed on a side of the circuit board corresponding to the outgoing line direction and electrically coupled to the docking area.

10. The bus connection wire forward soldering structure according to claim 9, wherein the main body section comprises a slope section and a level section, and the slope section is obliquely connected between the second attaching section and the level section to make the level section bypass outer periphery of the connector.

* * * * *